(12) United States Patent
Iwatsuki

(10) Patent No.: US 9,963,133 B2
(45) Date of Patent: May 8, 2018

(54) METHOD FOR CONTROLLING BRAKING FORCE OF BRAKE DEVICES FOR TWO-WHEELED VEHICLE, AND DEVICE FOR CONTROLLING BRAKING FORCE

(71) Applicant: Bosch Corporation, Tokyo (JP)

(72) Inventor: Junya Iwatsuki, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/123,718

(22) PCT Filed: Feb. 27, 2015

(86) PCT No.: PCT/JP2015/055852
§ 371 (c)(1),
(2) Date: Sep. 6, 2016

(87) PCT Pub. No.: WO2015/133397
PCT Pub. Date: Sep. 11, 2015

(65) Prior Publication Data
US 2017/0008500 A1    Jan. 12, 2017

(30) Foreign Application Priority Data

Mar. 3, 2014  (JP) ................................ 2014-040674

(51) Int. Cl.
*B60T 8/26* (2006.01)
*B60T 8/24* (2006.01)
(Continued)

(52) U.S. Cl.
CPC ............ *B60T 8/261* (2013.01); *B60T 8/1706* (2013.01); *B60T 8/1766* (2013.01); *B60T 8/241* (2013.01); *B60T 2230/03* (2013.01)

(58) Field of Classification Search
CPC ... B60T 8/24; B60T 8/26; B60T 8/241; B60T 8/243; B60T 8/261
(Continued)

(56) References Cited

U.S. PATENT DOCUMENTS

| 5,445,443 A | * | 8/1995 | Hauser | ................. B60T 8/1706 303/137 |
| 6,367,892 B1 | * | 4/2002 | Proger | ................. B60T 8/1764 303/113.5 |

(Continued)

FOREIGN PATENT DOCUMENTS

| JP | 6122363 | 5/1994 |
| JP | 072077 | 1/1995 |

(Continued)

OTHER PUBLICATIONS

International Search Report for Application No. PCT/JP2015/055852 dated Jun. 2, 2015 (English Translation, 2 pages).

*Primary Examiner* — Thomas J Williams
(74) *Attorney, Agent, or Firm* — Michael Best & Friedrich LLP

(57) ABSTRACT

To provide braking-force control capable of suppressing a wheelie of a two-wheeled vehicle by changing braking-force distribution.
In a method for controlling a braking force of a combined brake system for the two-wheeled vehicle, a lean angle of a two-wheeled vehicle 1 is detected or computed, and, in the case where the lean angle exceeds a specified value, braking-force distribution to front and rear brake devices 11f, 11r is changed.

29 Claims, 7 Drawing Sheets

(51) Int. Cl.
   *B60T 8/17*     (2006.01)
   *B60T 8/1766*   (2006.01)
(58) Field of Classification Search
   USPC .................. 303/9.62, 9.64, 186, 187, DIG. 6
   See application file for complete search history.

(56) References Cited

U.S. PATENT DOCUMENTS

| | | | | |
|---|---|---|---|---|
| 7,469,975 | B2* | 12/2008 | Wagner | B60K 28/16 303/137 |
| 8,897,986 | B2* | 11/2014 | Ono | B60T 8/1706 701/72 |
| 8,989,980 | B2* | 3/2015 | Nishimura | B60T 8/1706 303/9.64 |
| 2005/0168059 | A1* | 8/2005 | Nishikawa | B60T 8/261 303/3 |

FOREIGN PATENT DOCUMENTS

| | | |
|---|---|---|
| JP | 8198077 | 8/1996 |
| JP | 201012903 | 1/2010 |
| WO | 2013115089 | 8/2013 |

* cited by examiner

Y Dir.: 0
Z Dir.: Zmax

Y Dir.: Increase to Y1
Z Dir.: Decrease to $\sqrt{Zmax^2 - Y1^2}$

Y Dir.: Increase to Y2
Z Dir.: Decrease to $\sqrt{Zmax^2 - Y2^2}$

METHOD FOR CONTROLLING BRAKING FORCE OF BRAKE DEVICES FOR TWO-WHEELED VEHICLE, AND DEVICE FOR CONTROLLING BRAKING FORCE

BACKGROUND OF THE INVENTION

The invention relates to a brake device for a two-wheeled vehicle and, in particular, to a method for controlling a braking force and a device for controlling the braking force in a combined brake system in which front and rear brake devices are operated in an interlocking manner.

As a brake device for a two-wheeled vehicle, a brake device called a combined brake system has conventionally been available. In this combined brake system, when one of front and rear brake devices is operated, a braking force is also generated in the other brake device in an interlocking manner. This combined brake system is available in a mechanical type (CBS) and an electronically controlled type (eCBS). In the combined brake system of the mechanical type, the front and rear brake devices are connected by a hydraulic circuit and a mechanical element. A pressure of brake fluid is set such that the braking force is distributed to the front and rear brake devices at a specified ratio (for example, front 6:rear 4) when a braking operation is performed on the combined brake system of the mechanical type.

Meanwhile, in a case of the combined brake system of the electronically controlled type, the front and rear brake devices are not connected by the hydraulic circuit or the mechanical element. The front and rear brake devices are operated in the interlocking manner by electronic control. Accordingly, braking-force distribution to the front and rear brake devices can flexibly be changed in accordance with a switching operation by a rider or a speed of the two-wheeled vehicle.

As an example of the combined brake system of the mechanical type, one as will be described below exists (see). This is a brake device capable of increasing the braking-force distribution to a rear wheel during an operation of a brake pedal. More specifically, a first master cylinder that is actuated by a brake lever is connected to a brake caliper of a front wheel, a mechanical servomechanism that generates a brake hydraulic pressure by actuation of the brake caliper is connected to a brake caliper of the rear wheel via a pressure control valve that decreases a braking force on the rear wheel in a manner to follow a braking-force distribution characteristic of the front and rear wheels. In addition, a brake hydraulic pressure from a second master cylinder that is actuated by the brake pedal is transmitted to the brake caliper of the rear wheel via the mechanical servomechanism and the pressure control valve and, at the same time, increases a maximum braking force on the rear wheel by changing a pressure decreasing characteristic of the pressure control valve.

SUMMARY OF THE INVENTION

However, the following problem is inherent to the combined brake system according to the above background art. More specifically, the braking-force distribution of the combined brake system is basically set with an assumption of a case where the two-wheeled vehicle travels in an upright state. Thus, even in the case where the two-wheeled vehicle is inclined to travel on a curve during actual traveling, the same amounts of the braking force as those during traveling in the upright state on a straight road is distributed to the front and rear brake devices. Usually, in the two-wheeled vehicle that is not equipped with the combined brake system, only the rear brake device is used to adjust the speed when the two-wheeled vehicle travels on the curve. This is to avoid a "wheelie" of the two-wheeled vehicle. Here, the wheelie is a phenomenon where the two-wheeled vehicle makes an attempt to rise when the braking force is generated in a front brake during traveling of the two-wheeled vehicle in the inclined state on the curve. Meanwhile, in a case of the two-wheeled vehicle that includes the combined brake system, the braking force is generated in the front brake device when only the rear brake device is operated during traveling on the curve. As a result, the wheelie occurs to the two-wheeled vehicle, and it becomes difficult for the rider to travel according to his or her own intention.

In view of the above problem, the invention has a purpose of suppressing occurrence of a wheelie even in the case where a two-wheeled vehicle that includes a combined brake system travels on a curve. Noted that the purpose is merely one example and thus interpretation of the invention should not be restricted by the purpose.

In order to solve the above problem, first means is a method for controlling a braking force of a combined brake system for a two-wheeled vehicle and adopts such a configuration of: detecting or computing a lean angle of the two-wheeled vehicle; and changing braking-force distribution to front and rear brake devices in the case where the lean angle exceeds a specified value. By adopting such a configuration, the lean angle of the two-wheeled vehicle is first detected or computed. Then, in the case where the lean angle is generated, the braking-force distribution to the front and rear brake devices is changed. For example, in the case where a braking force of the front brake device is decreased in accordance with the lean angle, the braking force that is generated in the front brake device is decreased from that during normal traveling even when a braking operation is performed on the rear brake device. Accordingly, a wheelie of the two-wheeled vehicle can efficiently be suppressed.

In addition to the configuration of the first means, second means adopts such a configuration that the braking-force distribution to the front brake device is changed in accordance with the lean angle.

In addition to the configuration of the first or second means, third means adopts such a configuration that the braking-force distribution to the front brake device is decreased as the lean angle is increased.

In addition to any configuration of the first means to the third means, fourth means adopts such a configuration that a braking force of the rear brake device is never changed when the braking-force distribution is changed.

In addition to any configuration of the first means to the fourth means, fifth means adopts such a configuration that changing of the braking-force distribution is initiated at the approximately same time as a braking operation by a rider.

In addition to any configuration of the first means to the fifth means, sixth means adopts such a configuration that changing of the braking-force distribution is executed only in the case where a larger braking force than a specified braking force is generated in at least one of the front brake device and the rear brake device.

In addition to any configuration of the first means to the sixth means, seventh means adopts such a configuration that changing of the braking-force distribution is terminated at a time point of an end of a lean state or after a lapse of a specified time from this time point of the end.

In addition to any configuration of the first means to the seventh means, eighth means adopts such a configuration that, upon termination of control for changing the braking-force distribution, a difference between the braking-force distribution in a normal state and the changed braking-force distribution is computed and the changed braking-force distribution is controlled so as to gradually approach the braking-force distribution in the normal state within a specified time.

In addition to any configuration of the first means to the eighth means, ninth means adopts such a configuration that the braking-force distribution is changed by changing a pressure of brake fluid that is supplied to the front brake device.

In addition to any configuration of the first means to the ninth means, tenth means adopts such a configuration that, in the case where a braking operation amount by the rider is increased while the control for changing the braking-force distribution is executed, a target pressure that should be applied to the front brake device is computed on the basis of the braking-force distribution at the time point, the target pressure is compared to a current pressure, and a lower pressure of these is applied to the front brake device.

Eleventh means is a device for controlling a braking force of a combined brake system for a two-wheeled vehicle and adopts such a configuration of including: a lean angle detection and computation section that detects or computes a lean angle of the two-wheeled vehicle; and a control section that changes braking-force distribution to front and rear brake devices in the case where the lean angle exceeds a specified value.

In addition to the configuration of the eleventh means, twelfth means adopts such a configuration that the control section changes the braking-force distribution to the front brake device in accordance with the lean angle.

In addition to the configuration of the eleventh means or the twelfth means, thirteenth means adopts such a configuration that the control section decreases the braking-force distribution to the front brake device as the lean angle is increased.

In addition to any configuration of the eleventh means to the thirteenth means, fourteenth means adopts such a configuration that the control section never changes a braking force of the rear brake device when changing the braking-force distribution.

In addition to any configuration of the eleventh means to the fourteenth means, fifteenth means adopts such a configuration that changing of the braking-force distribution by the control section is initiated at the approximately same time as a braking operation by a rider.

In addition to any configuration of the eleventh means to the fifteenth means, sixteenth means adopts such a configuration that changing of the braking-force distribution by the control section is executed only in the case where a larger braking force than a specified braking force is generated in at least one of the front brake device and the rear brake device.

In addition to any configuration of the eleventh means to the sixteenth means, seventeenth means adopts such a configuration that changing of the braking-force distribution by the control section is terminated at a time point of an end of a lean state or after a lapse of a specified time from this time point of the end.

In addition to any configuration of the eleventh means to the seventeenth means, eighteenth means adopts such a configuration that, upon termination of control for changing the braking-force distribution, the control section computes a difference between the braking-force distribution in a normal state and the changed braking-force distribution and controls the changed braking-force distribution so as to make the changed braking-force distribution gradually approach the braking-force distribution in the normal state within a specified time.

In addition to any configuration of the eleventh means to the eighteenth means, nineteenth means adopts such a configuration that the braking-force distribution by the control section is changed by changing a pressure of brake fluid that is supplied to the front brake device.

In addition to any configuration of the eleventh means to the nineteenth means, twentieth means adopts such a configuration that, in the case where a braking operation amount by the rider is increased while the control for changing the braking-force distribution is executed, the control section computes a target pressure that should be applied to the front brake device on the basis of the braking-force distribution at the time point, compares the target pressure to a current pressure, and applies a lower pressure of these to the front brake device.

In addition to any configuration of the eleventh means to the twentieth means, twenty-first means adopts such a configuration that the lean angle detection and computation section includes an acceleration sensor.

Twenty-second means adopts such a configuration of a two-wheeled vehicle that includes: a brake lever; a brake pedal; front and rear brake devices that respectively generate braking forces by operation forces from these brake lever and brake pedal; and the device for controlling the braking force according to any one of the tenth means to the twenty-first means.

DETAILED DESCRIPTION

Figure 1:
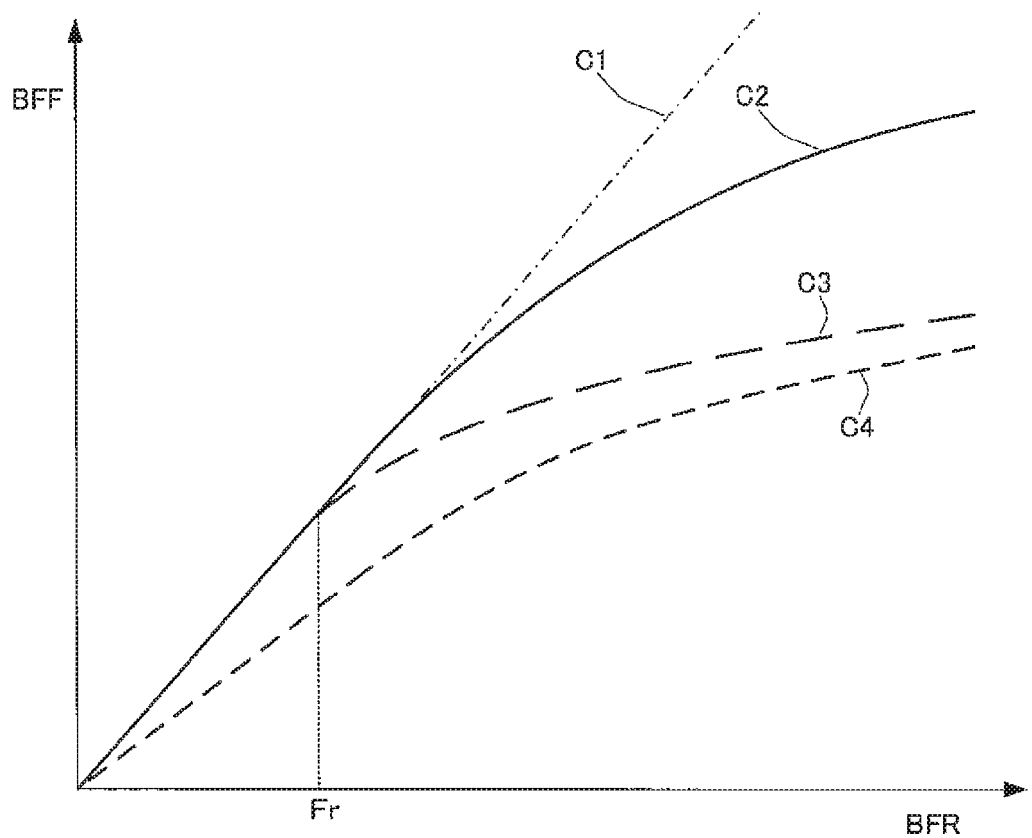
FIG. 1 is a chart for explaining braking-force control according to the invention.

A description will hereinafter be made on a method for controlling a braking force of a combined brake system for a two-wheeled vehicle in one embodiment of the invention with reference to the drawings. The method for controlling the braking force in this embodiment is characterized by detecting or computing a lean angle of a two-wheeled vehicle and changing braking-force distribution to front and rear brake devices in the case where the lean angle exceeds a specified angle in the two-wheeled vehicle that includes the combined brake system. FIG. 1(A) is a chart that depicts a braking-force distribution characteristic of a front brake and a rear brake in a manner to compare conventional braking-force control to braking-force control of this embodiment. In these FIG. 1(A), a horizontal axis indicates a braking force BFR that is generated in a rear brake device (a rear wheel), and a vertical axis indicates a braking force BFF that is generated in a front brake device. A one-dot chain line C1 in the chart is a line chart of a case where the braking-force distribution to the front and rear wheels is assumed to have a constant value (for example, front 6:rear 4). In the case where such braking-force distribution is set, the braking-force distribution to the front and rear is not changed even when the braking force is increased. Noted that the lean angle can be computed on the basis of information from acceleration sensors (horizontal G, vertical G sensors) that are attached to the two-wheeled vehicle, for example.

However, the actual two-wheeled vehicle that includes the combined brake system is controlled such that the braking-force distribution to the front wheel is decreased when the braking force exceeds a specified braking force (a solid line C2 in the chart). Accordingly, along with an increase in the braking force, the line chart C2 of the actual braking force gradually moves downward from the line chart C1 of the constant braking-force distribution. However, the braking-force distribution characteristic is merely that of the conventional combined brake system. That is, the braking-force distribution characteristic is based on control for which the lean angle of the two-wheeled vehicle is not taken into consideration. On the other hand, according to the method for controlling the braking force according to this embodiment, the braking-force distribution to the front brake device is controlled to be further decreased in the case where the lean angle is generated (during cornering). Two line charts C3, C4 by broken lines in the chart depict the braking-force distribution by the method for controlling the braking-force according to this embodiment.

First, in the line chart C3, within a range where the braking force of the rear brake device is from 0 to a specified value Fr, the braking-force distribution is the same as that by the line chart C2 of the conventional combined brake system. However, after the braking force of the rear brake device exceeds the specified value Fr, the braking-force distribution to the front brake device is decreased. Accordingly, the line chart C3 moves downward from the line chart C2. This line chart C3 depicts a braking-force distribution characteristic in the case where a small lean angle is generated in the two-wheeled vehicle.

In addition, the line chart C4 depicts a braking-force distribution characteristic in the case where a large lean angle is generated in the two-wheeled vehicle. As it is understood from this line chart C4, the braking-force control of this embodiment is executed at the same time as generation of the braking force, and the braking-force distribution to the front brake device is decreased. Accordingly, in an entire range of the braking force of the rear brake device, the line chart C4 is located on a lower side of the line chart C2 that depicts the conventional braking-force distribution characteristic. Noted that FIG. 1 depicts two types of the line charts C3, C4 as exemplary cases where the lean angle is generated; however, the invention is not limited thereto. That is, three or more types of the braking-force distribution characteristics may be used in accordance with a magnitude of the lean angle.

Figure 2:
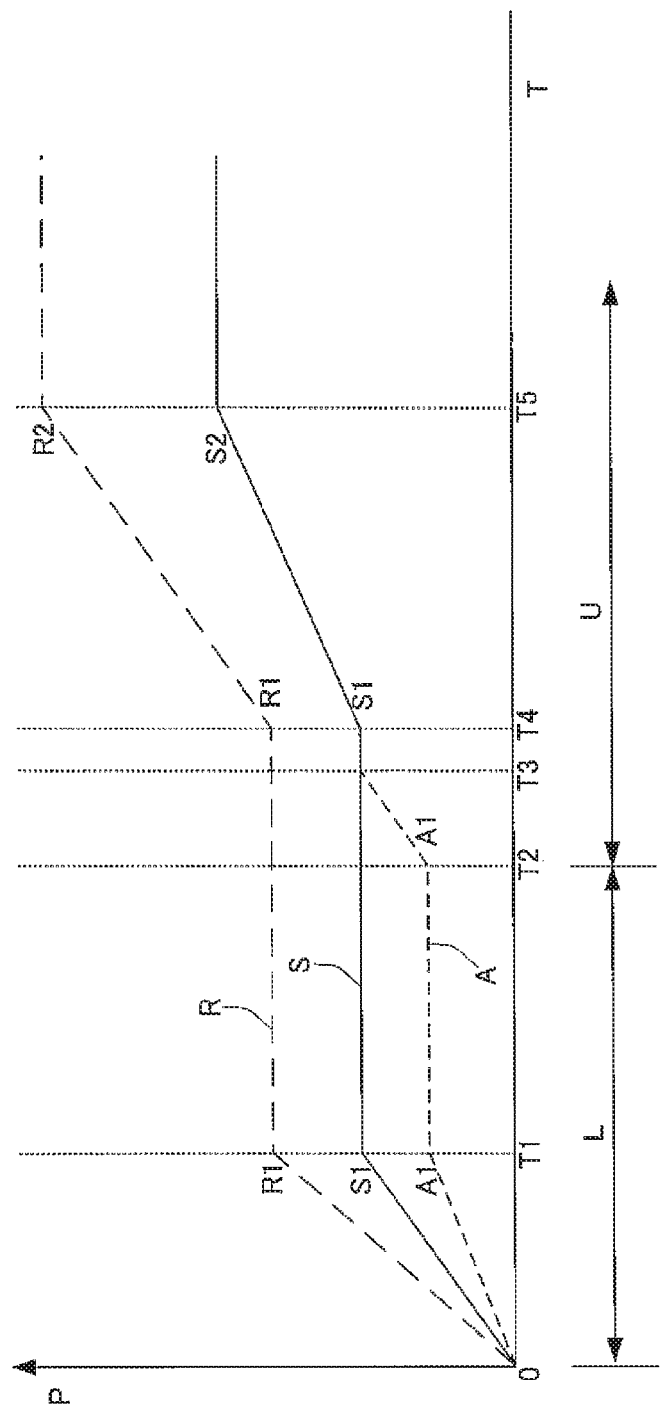
FIG. 2 is a chart that depicts a timeline of pressure control of brake fluid, the pressure being applied to front and rear brake devices.

FIG. 2 is a chart that depicts a timeline of a relationship between pressures applied to the front and rear brake devices at a time when the two-wheeled vehicle is shifted from a lean state L to an upright state U. That is, a horizontal axis indicates time T, and a vertical axis indicates a pressure P that is applied to the front and rear brake devices. A long broken line R in the chart is a line chart that depicts a timeline of the pressure applied to the rear brake device. In this chart, the pressure of the rear brake device is increased from 0 to R1 in a period from time 0 to time T1 and is maintained at the pressure R1 in a period from the time T1 to time T4. Then, the pressure is increased from R1 to R2 in a period from the time T4 to time T5, and the pressure is further maintained at R2 at the time T5 onward. Meanwhile, it is assumed that the lean angle of the two-wheeled vehicle becomes 0 (the upright state) at time T2.

What has been described so far will be described from a perspective of a braking operation. A series of the braking operations, in which a depression amount of a brake pedal for operating the rear brake device is gradually increased (T0→T1), the depression amount of the brake pedal is maintained for a specified time (T1→T4), then the depression amount of the brake pedal is further increased (T4→T5), and the depression amount of the brake pedal is maintained again (T5 →), are performed. Noted that the braking operations are one example for describing this embodiment and the invention is not limited thereto.

With respect to the above-described timeline of the pressure that is applied to the rear brake device, the pressure is also applied to the front brake device due to a function of the combined brake system, and a specified braking force is generated therein. Here, a solid line S in the chart is a line chart that depicts a pressure applied to the front brake device in the conventional combined brake system. As depicted in this chart, the pressure is increased linearly to a pressure S1 in the period from the time 0 to the time T1. Then, the pressure of the front brake device is maintained at S1 in the period from the time T1 to the time T4. Accordingly, a ratio of the pressure applied to the rear brake device to the pressure applied to the front brake becomes constant. As a result, the braking-force distribution to the front and rear brake devices also becomes constant. Furthermore, the pressure is increased linearly from S1 to S2 in the period from the time T4 to the time T5, and the pressure is maintained at S2 at the time T5 onward.

Next, a line chart depicted by a short broken line A indicates a characteristic of the pressure that is applied to the front brake device in the case where control for changing the braking-force distribution according to this embodiment is executed. As depicted in this chart, the two-wheeled vehicle is in the lean state at the time T1, and the pressure that is applied to the front brake device is decreased to be lower than the pressure that is applied by the conventional combined brake system. That is, a lower pressure A1 than the pressure S1 that is applied to the front brake of the conventional combined brake system is applied at the time T1. In other words, the braking-force distribution to the front and rear brake devices is changed. In this way, even in the cases where the rear brake device is operated and the braking force is generated on the front brake during traveling of the two-wheeled vehicle in the lean state, the braking force of the front brake device is decreased to be lower than the braking force thereof in the upright state. As a result, a wheelie of the two-wheeled vehicle is effectively prevented.

In addition, in this embodiment, the pressure to the front brake device is decreased at a constant rate until the time T2 at which the lean state ends. Then, the control for changing the braking-force distribution is terminated at time T3. That is, at the time T2, a pressure difference is made between the pressure S1 by the background art and the actually applied pressure A1. However, distribution of the pressure to the front brake device is increased such that this pressure difference is eliminated at the time T3. Just as described, in this embodiment, termination processing of the control for changing the braking-force distribution is initiated at the same time as the end of the lean state, and the braking-force distribution is controlled such that the pressure difference is eliminated after a lapse of a specified time. In this way, a rider does not receive a sense of discomfort during switching. If the braking-force distribution is abruptly changed to that in the case of the upright state at the same time as the end of the lean state, the braking force of the front brake device is abruptly increased. Such control gives the rider the sense of discomfort during switching. Noted that various control methods are considered for the termination processing of the control for changing the braking-force distribution that is executed from the end of the lean state. For example, a method for gradually terminating the control by spending a specified time (for example, 5 seconds) from the end of the lean state, a method for changing a time required for the termination processing in accordance with a magnitude of the pressure difference, and the like are raised. That is, in the case where the pressure difference is large, a longer time is spent for the termination processing in comparison with a case where the pressure difference is small. Noted that the control at the time T3 onward is the same as the case of the control for changing the braking-force distribution for the conventional combined brake system (the solid line S).

Figure 3:
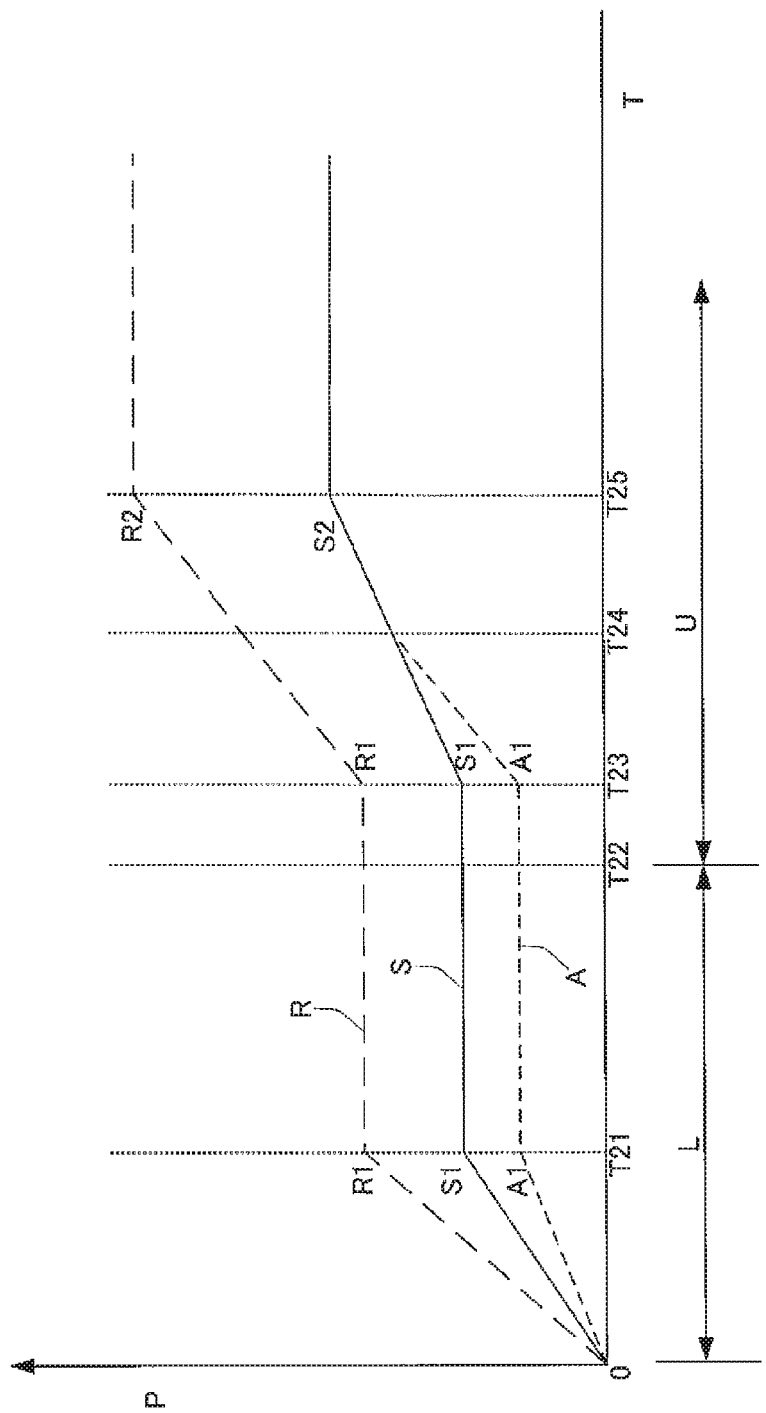
FIG. 3 is a chart that depicts a modified example of the pressure control disclosed in FIG. 3.

Next, FIG. 3 depicts a modified example of the control for changing the braking-force distribution disclosed in FIG. 2. Similar to FIG. 2, the horizontal axis indicates the time T, and the vertical axis indicates the pressure P that is applied to the front and rear brake devices. In the modified example, a timeline of a pressure that is applied to the rear brake device is assumed to be the same as that in the case of FIG. 2. Meanwhile, in this modified example, termination timing of the control for changing the braking-force distribution differs from that in the case of FIG. 2. More specifically, the two-wheeled vehicle is shifted from the lean state to the upright state at time T22. However, a change is not made to the changed braking-force distribution at this time point. Then, the termination processing of the control for changing the braking-force distribution is initiated at time T23 after a lapse of a specified time from the time T22. In the example of FIG. 3, the control for changing the braking-force distribution is terminated in a period from time T23 to time T24. Just as described, at the time T22, at which the lean state is canceled, the control for changing the braking-force distribution is maintained as is. Then, the termination processing of the control for changing the braking-force distribution is initiated at a time point of the time T23 after cancelation of the lean state. Accordingly, the rider does not receive the sense of discomfort at the time point at which the lean state of the two-wheeled vehicle is canceled.

Figure 4:
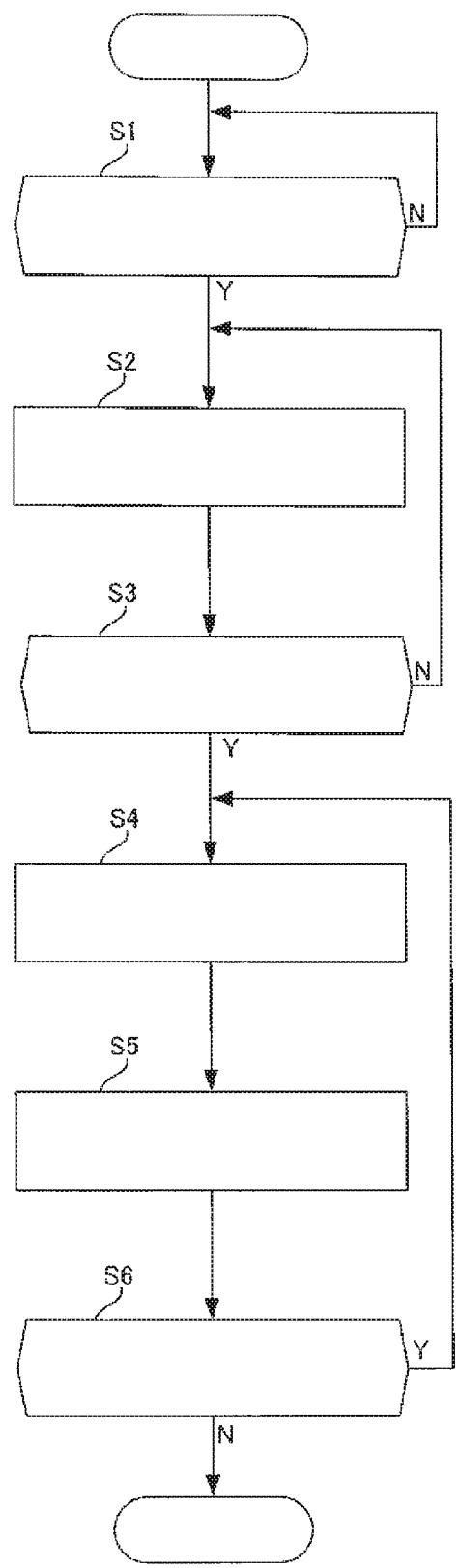
FIG. 4 is a flowchart that depicts a method for controlling a braking force according to the invention.

FIG. 4 is a flowchart for explaining the method for controlling the braking force in this embodiment. As depicted in this chart, presence or absence of the braking operation is first determined (step S1). If the braking operation is not performed (N in step S1), the presence or the absence of the braking operation is repeatedly determined (step S1). If the braking operation is performed (Y in step S1), information on the lean angle is obtained next (step S2). Next, it is determined whether the lean angle exceeds a specified value (step S3). If the lean angle does not exceed the specified value (N in step S3), a value of the lean angle is obtained again (step S2). On the other hand, if the lean angle exceeds the specified value (Y in step S3), the control for changing the braking-force distribution in this embodiment is executed. More specifically, a target pressure Pnew that should be applied to the front brake device is calculated such that the braking-force distribution becomes one in the case where the lean angle is generated (step S4). This target pressure Pnew is a pressure that is lower than the pressure during traveling in the upright state.

Thereafter, the target pressure Pnew is output (step S5), and the pressure that is applied to the front brake device is thereby decreased. At this time, the pressure that is applied to the rear brake device is never changed. In this way, the braking force generated by the front brake device is decreased, and the wheelie of the two-wheeled vehicle is suppressed. Then, it is determined again whether the lean angle exceeds the specified value (step S6). If the lean angle exceeds the specified value (Y in step S6), the target pressure Pnew is calculated and output again (steps S4, S5). This is because it is determined that the lean state continues. On the other hand, if the lean angle does not exceed the specified value (N in step S6), it can be determined that the two-wheeled vehicle has returned to the upright state. Thus, the control for changing the braking-force distribution in this embodiment is terminated.

Figure 5:
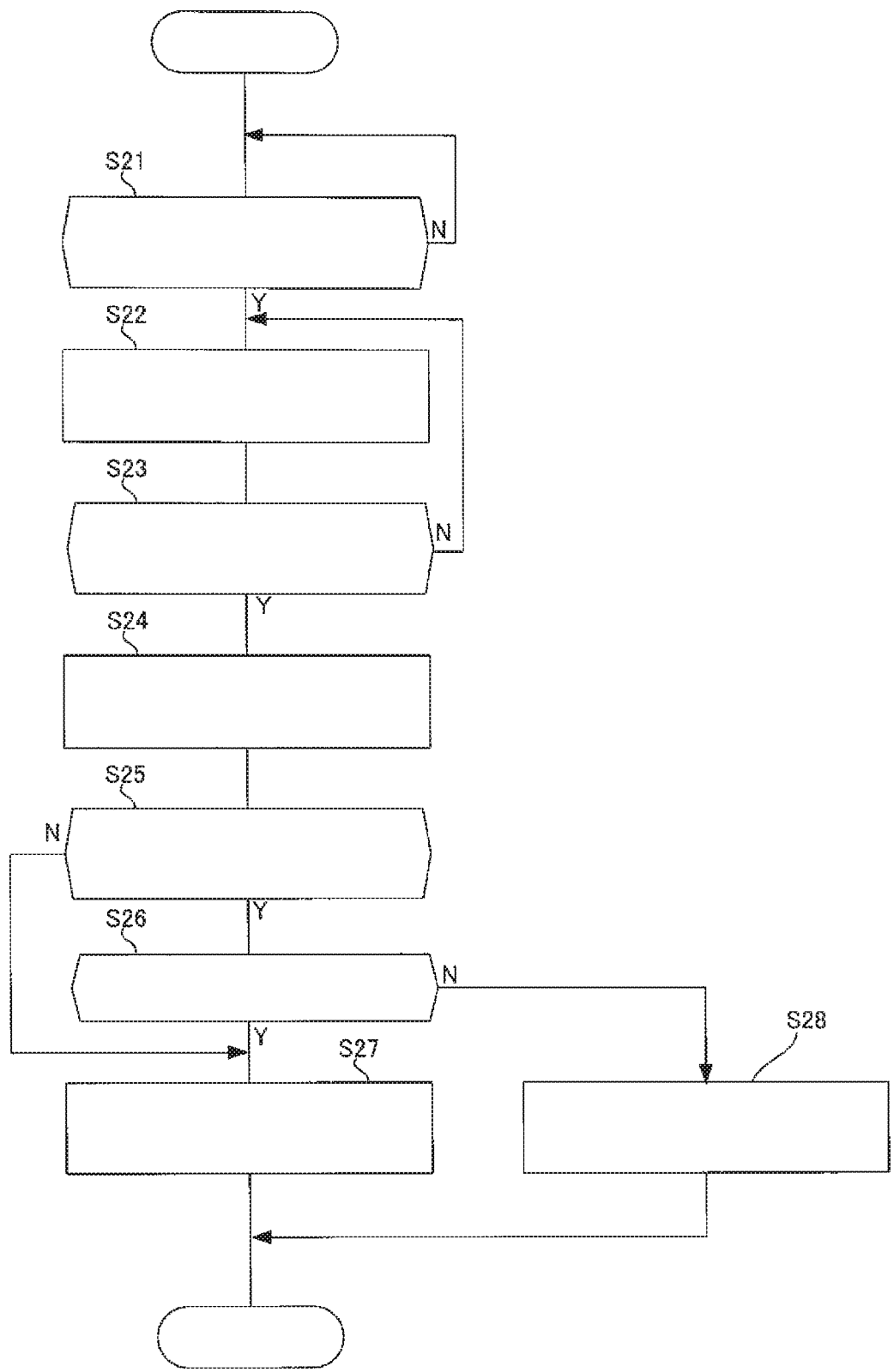
FIG. 5 is a flowchart of a modified example of the method for controlling the braking force disclosed in FIG. 4.

FIG. 5 is a flowchart that depicts a modified example of the control for changing the braking-force distribution disclosed in FIG. 4. While a basic control method is the same as that in the example of FIG. 4, the control differs in a point that a case where the braking operation is performed during the control for changing the braking-force distribution is assumed. More specifically, after the target pressure Pnew is calculated (step S24), the target pressure Pnew and a current pressure Pcurrent are compared (step S25). Then, if the target pressure Pnew is lower than the current pressure Pcurrent (N in step S25), the target pressure Pnew is output as the pressure that should be applied to the front brake device (step S27).

On the other hand, if the target pressure Pnew is higher than the current pressure Pcurrent (Y in step S25), it is determined whether a braking operation amount is increased. This increase in the braking operation amount indicates a case where the rider operates the rear brake device to generate the further larger braking force. If the braking operation amount is not increased (N in step S26), the current pressure Pcurrent is output. This current pressure Pcurrent is a pressure that is lower than the target pressure Pnew. On the contrary, if the braking operation amount is increased (Y in step S26), the target pressure Pnew is output. This means that the pressure applied to the front brake device is increased from the current pressure Pcurrent to the target pressure Pnew but the pressure is not increased any more. As it is apparent from what has been described so far, in the case where the braking operation amount is not increased, the lower pressure of the target pressure Pnew and the current pressure Pcurrent is output. Even in the case where the braking operation amount is increased, the pressure that is applied to the front brake device is not increased in a manner to exceed the target pressure Pcurrent at which the wheelie of the two-wheeled vehicle can be prevented. Accordingly, the wheelie of the two-wheeled vehicle can effectively be suppressed in any case. Noted that, as described above on the basis of FIG. 3, the control with which the rider does not receive the sense of discomfort can be executed through the termination processing of the control for changing the braking-force distribution; however, this may be incorporated in any of the control flows described in FIG. 4 and FIG. 5.

Figure 6A:
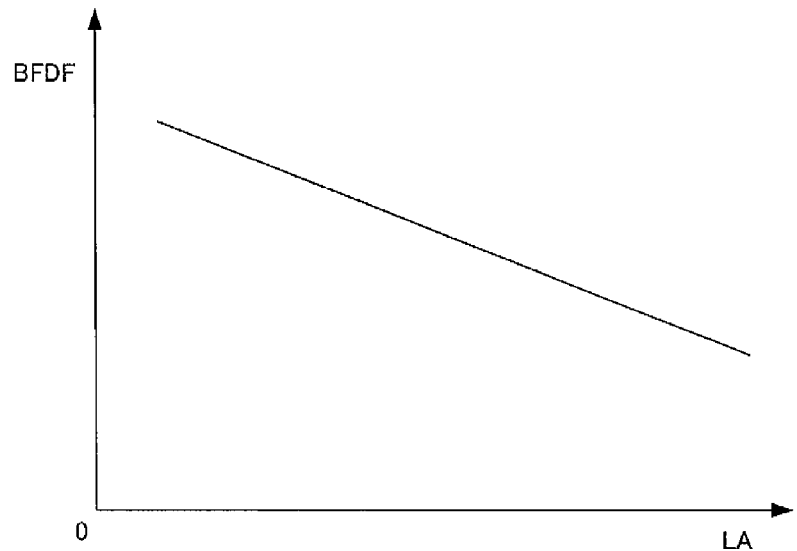
FIG. 6*a* is a chart that depicts a relationship between a lean angle and braking-force distribution to the front brake device.
Figure 6B:
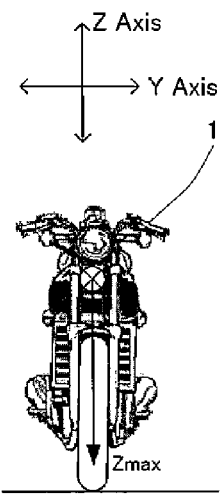
FIG. 6*b* is a view that depicts no lean angle.
Figure 6C:
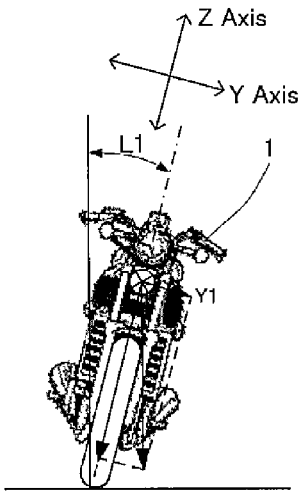
FIG. 6*c* is a view that depicts a small lean angle.
Figure 6D:
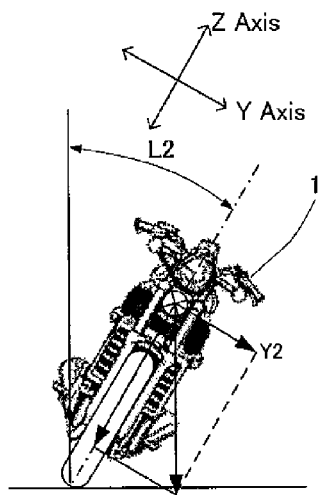
FIG. 6*d* is a view that depicts a large lean angle.

FIG. 6a depicts a relationship between the lean angle and the braking force of the front brake device qualitatively. A horizontal axis indicates a lean angle LA, and a vertical axis indicates braking-force distribution BFDF to the front brake device. In addition, FIG. 6b to FIG. 6d are views for explaining the lean angle. Here, it is assumed that a specified braking operation is performed on the rear brake device. As depicted in FIG. 6b, in the case where the lean angle is not generated in a two-wheeled vehicle 1, only a load Zmax in a vertical (Z Axis) direction (Z Dir.) is generated at the center of gravity of the two-wheeled vehicle, and a load in a horizontal (Y Axis) direction (Y Dir.) is "0". In this state, the control for changing the braking-force distribution is not executed. Accordingly, the braking force is generated in the front brake device by the braking-force distribution in the case of traveling in the upright state. Meanwhile, when the lean angle is generated, the braking-force distribution is controlled such that the braking force generated in the front brake device is decreased. An example of the chart depicts a case where, with respect to the lean angle, the braking-force distribution is decreased as a linear function with a negative proportional constant. Accordingly, the braking force that is generated by the front brake device becomes smaller in a case of a large lean angle L2 (see FIG. 6d) than in a case of a small lean angle L1 (see FIG. 6c). Here, in an example of FIG. 6c, when compared to the case of FIG. 6b, a component Y1 in the Y Dir. is generated, and, in conjunction with this, a component in a Z Dir. is decreased. In addition, in an example of FIG. 6d, when compared to the example of FIG. 6c, the component in the Y Dir. is increased to Y2, and, in conjunction with this, the component in the Z Dir. is further decreased.

Noted that, in the above description, it is described that the control for changing the braking-force distribution is executed in the case where the lean angle exceeds the specified value. It is because the wheelie of the two-wheeled vehicle is unlikely to occur even without changing the braking-force distribution in the case where only the slight lean angle is generated. Accordingly, as a condition on the execution of the control for changing the braking-force distribution, such control may be executed that the control for changing the braking-force distribution is executed only in the case where the lean angle is at least equal to 10°. Meanwhile, the control for changing the braking-force distribution may be executed regardless of the magnitude of the lean angle in the case where the lean angle is generated.

Figure 7:
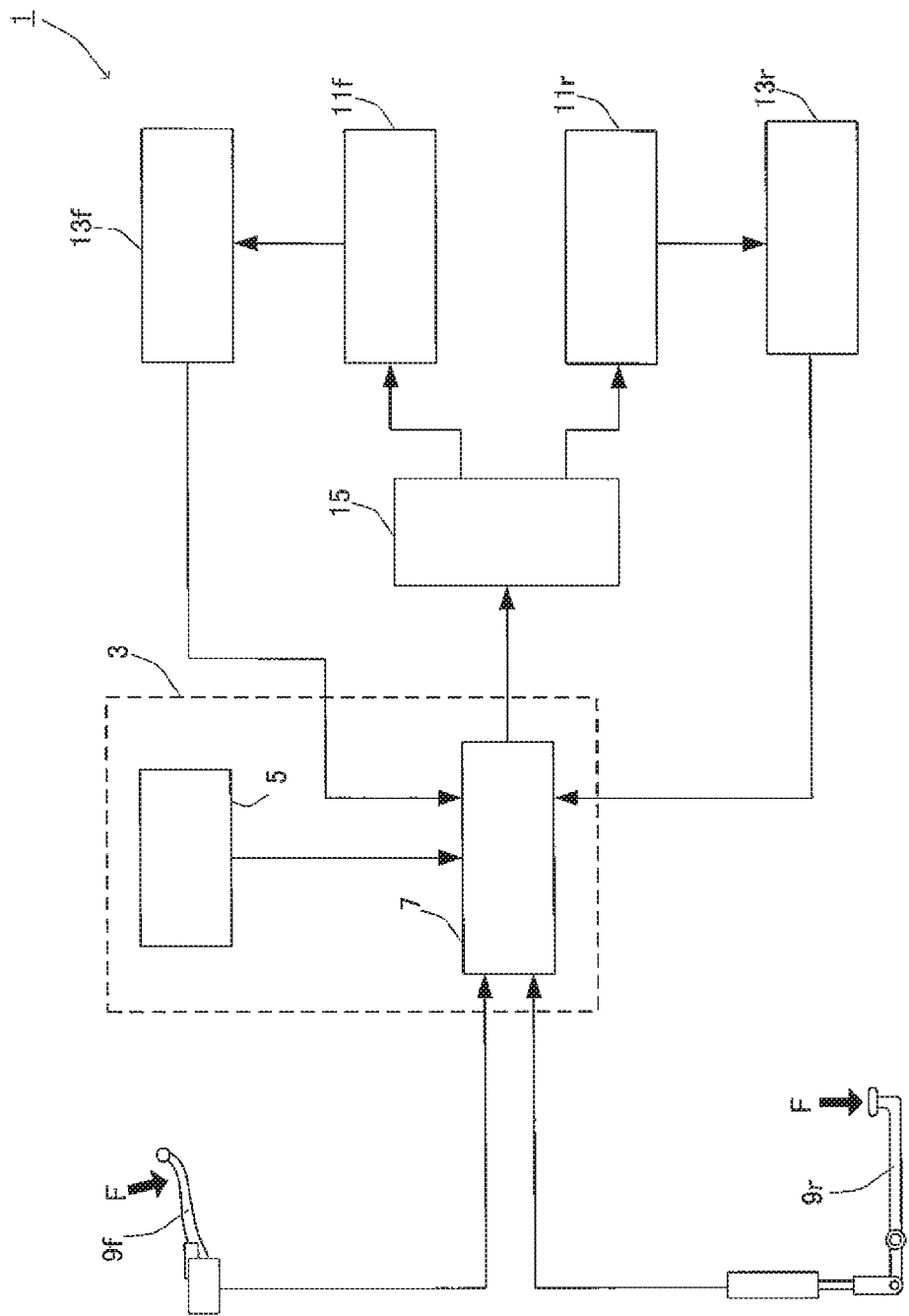
FIG. 7 is a block diagram that depicts a device for controlling the braking force of the invention.

FIG. 7 is a block diagram that depicts the two-wheeled vehicle 1 and depicts a device for controlling the braking force 3 for realizing the control for changing the braking-force distribution according to this embodiment. The device for controlling the braking force 3 has: a lean angle detection and computation section 5 that detects or computes the lean angle; and a control section 7 that controls braking-force distribution to front and rear brake devices 11f, 11r on the basis of information from this lean angle detection and calculation section 5. In addition, as components that are connected to the device for controlling the braking force 3, the followings are raised. More specifically, a front brake lever 9f and a rear brake pedal 9r, each of which inputs information on the braking operation to the control section 7; an actuator or a hydraulic circuit 15 that is operated on the basis of a signal output from the control section 7; and the front and rear brake devices 11f, 11r, each of which generates the braking force by an operation of this actuator or a hydraulic circuit 15 are provided. Furthermore, a front pressure sensor 13f and a rear pressure sensor 13r are respectively provided for the front and rear brake devices 11f, 11r. These are used to detect applied pressures at a time when the front and rear brake devices 11f, 11r are hydraulically operated. Noted that, in the case where the braking forces of the front and rear brake devices 11f, 11r are completely controlled by electronic control, a position sensor, a load sensor, and the like have to be equipped instead of the pressure sensors 13f, 13r.

A description will hereinafter be made on an operation of the device for controlling the braking force 3. In the case where the rider performs the braking operation when the two-wheeled vehicle 1 travels in the upright state, an operation force F is input by the front brake lever 9f or the rear brake pedal 9r. The control section 7 computes the braking force that corresponds to the input operation force and outputs it to the actuator or the hydraulic circuit 15. On the basis of the input signal, the actuator or the hydraulic circuit 15 generates the braking force to the front brake device 11f and the rear brake device 11r. Noted that a target of the device for controlling the braking force 3 in this embodiment is the combined brake system. Accordingly, even in the case where only the front brake lever 9f is operated, the braking force is also generated in the rear brake device 11r. On the other hand, even in the case where only the rear brake pedal 9r is operated, the braking force is also generated in the front brake device 11f.

Next, a description will be made on a case where the lean angle of the two-wheeled vehicle 1 is at least equal to the specified value. The lean angle of the two-wheeled vehicle 1 is obtained by the lean angle detection and computation section 5. Information on the obtained lean angle is transmitted as a signal to the control section 7. The control section 7 computes the above-described target pressure in the case where the obtained lean angle exceeds the specified value. This target pressure is a decreased pressure that is applied to the front brake device 11f. On the basis of the computed target pressure, the control section 7 controls the actuator or the hydraulic circuit 15. Then, the pressure of the front brake device 11f is decreased, and the wheelie of the two-wheeled vehicle is thereby prevented.

The invention can be used to control the braking-force distribution for the combined brake system.

The invention claimed is:

1. A method for controlling a braking force of a combined brake system for a two-wheeled vehicle, the method comprising:
   detecting or computing a lean angle of the two-wheeled vehicle; and
   changing a braking-force distribution to front and rear brake devices when the lean angle exceeds a specified value;
   wherein upon termination of control for changing the braking-force distribution, a difference between the braking-force distribution in a normal state and the changed braking-force distribution is computed, and the changed braking-force distribution is controlled so as to gradually approach the normal state of braking-force distribution within a specified time.

2. The method according to claim 1, wherein the braking-force distribution to the front brake device is changed in accordance with the lean angle.

3. The method according to claim 1, wherein the braking-force distribution to the front brake device is decreased as the lean angle is increased.

4. The method according to claim 1, wherein a braking force of the rear brake device is not changed when the braking-force distribution is changed.

5. The method according to claim 1, wherein changing of the braking-force distribution is initiated at approximately the same time as a braking operation by a rider.

6. The method according to claim 1, wherein
changing of the braking-force distribution is executed in the case where a larger braking force than a specified braking force is generated in at least one of the front brake device and the rear brake device.

7. The method according to claim 1, wherein
changing of the braking-force distribution is terminated at a point in time when an end of a lean state occurs or after a lapse of a second specified time.

8. The method according to claim 1, wherein
the braking-force distribution is changed by changing a pressure of brake fluid that is supplied to the front brake device.

9. The method according to claim 1, wherein,
in the case where a braking operation amount by a rider is increased while the control for changing the braking-force distribution is executed, a target pressure to be applied to the front brake device is computed on the basis of the braking-force distribution at a point in time when an end of a lean state occurs, the target pressure compared to a current pressure, and a lower of the target pressure and the current pressure is applied to the front brake device.

10. A two-wheeled vehicle comprising:
a brake lever;
a brake pedal;
front and rear brake devices that respectively generate braking forces by operation forces from the brake lever and the brake pedal; and
the device for controlling the braking force according to claim 9.

11. A device for controlling a braking force of a combined brake system for a two-wheeled vehicle, the device comprising:
a lean angle detector and computer that detects or computes a lean angle of the two-wheeled vehicle; and
a controller that changes braking-force distribution to front and rear brake devices when the lean angle exceeds a specified value;
wherein upon termination of control for changing the braking-force distribution, the controller computes a difference between the braking-force distribution in a normal s changed braking-force distribution and controls the changed braking-force distribution so as to make the changed braking-force distribution gradually approach the normal state braking-force distribution within a specified time.

12. The device according to claim 11, wherein
the controller changes the braking-force distribution to the front brake device in accordance with the lean angle.

13. The device according to claim 11, wherein
the controller decreases the braking-force distribution to the front brake device as the lean angle is increased.

14. The device according to claim 11, wherein
the controller does not change a braking force of the rear brake device when changing the braking-force distribution.

15. The device according to claim 11, wherein
changing of the braking-force distribution by the control section is initiated at approximately the same time as a braking operation by a rider.

16. The device according to claim 11, wherein
changing of the braking-force distribution by the controller is executed when a larger braking force than a specified braking force is generated in at least one of the front brake device and the rear brake device.

17. The method according to claim 11, wherein
changing of the braking-force distribution is terminated at a point in time when an end of a lean state occurs or after a lapse of a second specified time.

18. The device according to claim 11, wherein
the braking-force distribution by the controller is changed by changing a pressure of brake fluid supplied to the front brake device.

19. The device according to claim 11, wherein
in the case where a braking operation amount by the rider is increased while the control for changing the braking-force distribution is executed, the controller computes a target pressure that should be applied to the front brake device on the basis of the braking-force distribution at a point in time when an end of a lean state occurs, compares the target pressure to a current pressure, and applies the lower of the target pressure and the current pressure to the front brake device.

20. The device according to claim 11, wherein
the lean angle detector and computer includes an acceleration sensor.

21. A device for controlling a braking force of a combined brake system for a two-wheeled vehicle, the device comprising:
a lean angle detector and computer that detects or computes a lean angle of the two-wheeled vehicle; and
a controller that changes braking-force distribution to front and rear brake devices when the lean angle exceeds a specified value;
wherein in the case where a braking operation amount by a rider is increased while the control for changing the braking-force distribution is executed, the controller computes a target pressure that should be applied to the front brake device on the basis of the braking-force distribution at a point in time when an end of a lean state occurs, compares the target pressure to a current pressure, and applies the lower of the target pressure and the current pressure to the front brake device.

22. The device according to claim 21, wherein
the controller changes the braking-force distribution to the front brake device in accordance with the lean angle.

23. The device according to claim 21, wherein
the controller decreases the braking-force distribution to the front brake device as the lean angle is increased.

24. The device according to claim 21, wherein
the controller does not change a braking force of the rear brake device when changing the braking-force distribution.

25. The device according to claim 21, wherein
changing of the braking-force distribution by the control section is initiated at approximately the same time as a braking operation by the rider.

26. The device according to claim 21, wherein
changing of the braking-force distribution by the controller is executed when a larger braking force than a specified braking force is generated in at least one of the front brake device and the rear brake device.

27. The device according to claim 21, wherein
changing of the braking-force distribution by the controller is terminated at the point in time when the end of a lean state occurs or after a lapse of a specified time.

28. The device according to claim 21, wherein
upon termination of control for changing the braking-force distribution, the controller computes a difference between the braking-force distribution in a normal state and the changed braking-force distribution and controls the changed braking-force distribution so as to make the changed braking-force distribution gradually approach the normal state braking-force distribution within a specified time.

29. The device according to claim 21, wherein the braking-force distribution by the controller is changed by changing a pressure of brake fluid supplied to the front brake device.

* * * * *